United States Patent [19]

Hulyalkar et al.

[11] Patent Number: 5,291,289
[45] Date of Patent: Mar. 1, 1994

[54] METHOD AND APPARATUS FOR TRANSMISSION AND RECEPTION OF A DIGITAL TELEVISION SIGNAL USING MULTICARRIER MODULATION

[75] Inventors: Samir N. Hulyalkar, Ossining, N.Y.; David A. Bryan, Danbury, Conn.; Carlo Basile, Ossining, N.Y.

[73] Assignee: North American Philips Corporation, New York, N.Y.

[21] Appl. No.: 854,177

[22] Filed: Mar. 20, 1992

Related U.S. Application Data

[63] Continuation-in-part of Ser. No. 614,885, Nov. 16, 1990, Pat. No. 5,214,501, and a continuation-in-part of Ser. No. 647,383, Jan. 29, 1991, Pat. No. 5,134,464, which is a continuation-in-part of Ser. No. 774,006, Oct. 8, 1991, Pat. No. 5,243,428.

[51] Int. Cl.$^5$ .............. H04N 5/40; H04N 7/06; H04L 5/12; H04L 23/02
[52] U.S. Cl. ................... 348/723; 375/39; 375/42; 348/469; 348/473
[58] Field of Search .......... 358/186, 12, 141, 142; 375/39, 42; 370/11, 20

[56] References Cited

U.S. PATENT DOCUMENTS

| | | | |
|---|---|---|---|
| 4,780,884 | 10/1988 | Karabinis | 370/20 |
| 5,022,053 | 6/1991 | Chung et al. | 375/39 |
| 5,056,117 | 10/1991 | Gitlin et al. | 375/39 |
| 5,057,786 | 10/1991 | Yoshikawa | 375/39 |
| 5,113,142 | 5/1992 | Yoshikawa | 375/39 |
| 5,113,412 | 5/1992 | Goldstein | 375/39 |
| 5,127,021 | 6/1992 | Schreiber | 358/142 X |
| 5,134,464 | 7/1992 | Basile et al. | 358/12 |

OTHER PUBLICATIONS

"A Bandwidth Allocation Strategy For A FDM Multicarrier Modem", R. L. Cupo, IEEE Trans-Commun., vol. 39, No. 5, May 91, pp. 644-646.

Primary Examiner—Mark R. Powell
Assistant Examiner—John W. Miller
Attorney, Agent, or Firm—Michael E. Marion

[57] ABSTRACT

A method and apparatus for modulating and demodulating an MCM television signal is described which is particularly useful in proposed "simulcast" HDTV terrestrial broadcasting. The MCM spectrum of the television signal is shaped using weighting coefficients which are derived from either an idealized NTSC signal or an actual NTSC co-channel signal. These coefficients are used to shape the respective MCM carriers to provide an energy distribution in the MCM signal which provides greater degree of robustness with a minimum degree of co-channel interference to and from an NTSC co-channel signal. The instant invention further takes advantage of the interference characteristics of composite television signals described above, to position the placement of the MCM carriers in frequency, to minimize interference with an NTSC co-channel signal. Several methods of deriving the weighting coefficients are described including an adaptive approach whereby the characteristics of the interfering NTSC transmission are received and the instantaneous NTSC spectrum calculated therefrom and weighting coefficients assigned accordingly. These coefficients can be transmitted to a receiver to update its coefficient table.

15 Claims, 8 Drawing Sheets

METHOD AND APPARATUS FOR TRANSMISSION AND RECEPTION OF A DIGITAL TELEVISION SIGNAL USING MULTICARRIER MODULATION

This application is a continuation-in-part of U.S. application Ser. Nos. 614,885, filed on Nov. 16, 1990, now U.S. Pat. No. 5,214,501; Ser. No. 647,383, filed on Jan. 29, 1991 now U.S. Pat. No. 5,134,464; and 774,006, filed on Oct. 8, 1991, now U.S. Pat. No. 5,243,438 all of which are incorporated by reference herein.

The following articles are also incorporated herein:

M. L. Doelz, E. T. Heald and D. L. Martin, "Binary Data Transmission Techniques for Linear Systems", Proc. IRE, vol. 45, pp. 656–661, May 1957;

S. B. Weinstein and P. M. Ebert, "Data Transmission by Frequency Division Multiplexing Using the Discrete Fourier Transform", IEEE Trans. Commun. Tech., vol. COM-19, pp. 628–634, Oct. 1971;

B. Hirosaki, "An Orthogonally Multiplexed QAM System Using the Discrete Fourier Transform", IEEE Trans. Comm., vol. COM-29, pp. 982–989, July 1981;

J. A. C. Bingham, "Multicarrier Modulation for Data Transmission: An Idea Whose Time Has Come", IEEE Communications Magazine, vol. 28, no. 5, pp. 5–14, May 1990;

R. Lasalle and M. Alard, "Principles of Modulation and Channel Coding for Digital Broadcasting For Mobile Receivers", EBU Review-Technical, no. 224, pp. 168–190, Aug. 1987;

W. L. Behrend, "Reduction of Co-Channel Television Interference by Precise Frequency Control of Television Picture Carriers", RCA Review, vol. XVII, no. 4, pp. 443–459, December, 1956; and G. T. Waters, F. Kozamernik, "Plans and Studies in the EBU for Satellite Broadcasting of Sound Radio"; EBU Review-Technical, Nos. 241-242, pp. 70–81, June/August, 1990.

BACKGROUND OF THE INVENTION

The so-called "simulcast" methodology currently favored by the Federal Communications Commission as the basis for advanced television broadcasting in the United States, involves transmitting a conventional television signal, for example NTSC, over a first television channel, and transmitting a high definition television (HDTV) signal over an additional channel which would be assigned to each broadcaster. Since the assignment of an additional channel to each broadcaster will involve the use of those channels currently designated as "taboo" channels (i.e. those restricted for use in a given location), use of those channels will require that a Way be found to prevent or minimize within acceptable limits, the interference caused by or to these additional broadcast signals with respect to the existing conventional signals.

The copending parent applications describe methods and apparatus for implementing a "simulcast" television signal which will eliminate, or minimize to acceptable levels, interference to and from a conventional television co-channel signal.

Although reference will be made herein to NTSC signals for the sake of brevity and example, it is to be understood that the invention would apply as well to any conventional composite television system (i.e. PAL, SECAM).

The systems described in the parent applications seek among other things, to minimize interference between a high definition television (HDTV) signal and an NTSC co-channel signal, by utilizing a plurality of subcarriers which are placed within the HDTV signal frequency spectrum in a manner which avoids, or minimizes interference with the picture, chroma and sound subcarriers of the NTSC co-channel signal. As described in the '383 application, these subcarriers are preferably modulated with digital information, utilizing, for example, quadrature amplitude modulation. The '383 and '006 applications further describe grouping digitally encoded television information according to relative perceptual importance, and modulating more important ("higher priority") data and relatively less important ("lower priority") data on different carriers in a manner which makes the higher priority data more robust and less susceptable to interference from an NTSC signal provided on a co-channel (i.e. "taboo" channel) or the susceptibility of a signal component to drop out due to reduced signal strength.

The parent applications describe system which suitably shape the spectrum of the coded signal in order to provide different signal-to-noise ratios for a number of carriers which are then frequency multiplexed to form the "simulcast" television signal. This provides the flexibility of conveying different types of information (e.g. different codewords or different bits) via different carriers. Each of the carriers can be positioned within the frequency spectrum of the "simulcast" television signal so that they minimize interference with the picture and color subcarriers of a co channel NTSC signal.

If received signal-to-noise power ratio (SNR) is above a certain minimum SNR, then virtually error-free transmission/reception is possible. SNR is dependent on the choice of the modulation strategy employed for digital transmission. Thus the coverage area can be increased by a combination of increasing the transmitter power and/or resorting to complex digital transmission techniques, trading complexity with reduced SNR requirements.

"Multicarrier Modulation" (MCM) is a technique in which serial data is transmitted by separating it into several parallel data streams which are then used to modulate a large number of orthogonal carriers. This technique has been referred to as orthogonally modulated QAM, orthogonal frequency division multiplexing (OFDM) or dynamically assigned multiple QAM in the references incorporated herein. The technique will be referred herein as MCM to refer to any or all of these methods of multicarrier modulation, or variations thereof.

The basic MCM principle consists of splitting a high digital bit rate (representing the signal to be transmitted) into numerous carriers carrying a low bit rate. In order to achieve a high spectral efficiency, the spectra of the carriers are overlapped. This is where MCM differs from ordinary frequency division multiplexing, where the spectra are not permitted to overlap.

MCM provides, among other advantages, greater immunity to noise and interference by distributing the signal among the several carriers which are distributed uniformly throughout the allocated frequency band.

A useful interference characteristic of composite television signals (e.g. NTSC) is that harmonic clusters of the chrominance signal are "frequency interleaved" in the luminance spectrum and simultaneously transmitted in compatible color television systems. Tests have shown that a first signal which is at a harmonic of the line-scanning rate, and a second signal at an odd harmonic of half the line-scanning rate which has approximately five times the voltage of the first signal, are equally visible. Therefore, if a television signal consisting of a low power carrier and a higher power carrier with a 14 dB difference between them, were properly interleaved in frequency with the spectrum of an NTSC co-channel signal, it would cause approximately the same degree of interference into the NTSC signal as would a co-channel signal having two lower power carriers. Thus a correlated co-channel signal can be more robust than a non-correlated lower power signal yet substantially equal to it with respect to interference with the NTSC signal.

The Waters et.al. reference incorporated herein, describes the use of orthogonal frequency division multiplex (OFDM) modulation for digital audio broadcasting (DAB). Waters hints that by carefully choosing the sub-carrier spacing (related to the television line spacing) it might be possible to interleave digital audio signals with geographically separated, co-channel analog television signals.

The instant invention has as one object, to provide a method and apparatus which takes advantage of the benefits provided by MCM techniques in television systems such as those described in the parent applications.

SUMMARY OF THE INVENTION

The interference of one signal into another is typically described in terms of acceptable desired signal to undesired signal power ratios (DUR). Different signal transmission techniques provide different minimum acceptable DURs. The instant invention comprises a method and apparatus for shaping the MCM spectrum of a digital television signal. An MCM modulator codes source coded data representing the television signal, into complex symbols, using for example Phase Amplitude Modulation/Phase Shift Keying (PAM-PSK) or Quadrature Amplitude Modulation (QAM) constellation mapping. These complex symbols are then each multiplied by respective weighting coefficients derived from either an idealized NTSC signal or an actual NTSC co-channel signal. These coefficients are used to shape the respective complex symbols thus shaping the amplitude of the MCM carriers. The shaped MCM signal has an energy distribution which provides a greater degree of robustness with a minimum degree of co-channel interference to and from the NTSC co-channel signal, than other proposed "simulcast" systems.

The instant invention further takes advantage of the interference characteristics of composite television signals described above, to position the placement of the MCM carriers in frequency, to minimize interference with an NTSC co-channel signal.

The embodiments of the invention described herein discuss several methods of evaluating the weighting coefficients in accordance with the invention. This analysis involves, in its most basic form, defining the nature of the spectrum of the NTSC co-channel signal. In one embodiment, a color bar signal is used to generate the NTSC spectrum used for deriving the weighting coefficients. An averaged NTSC spectrum can also be used.

In yet another embodiment, an adaptive approach is taken whereby if the characteristics of the interfering NTSC transmission are known, then the instantaneous NTSC spectrum can be calculated and weighting coefficients derived accordingly. These coefficients can be transmitted to a receiver to update its coefficient table.

In another embodiment of the invention, complex symbols coded from source coded data using different modulation formats (using, for example different constellations), can be modulated on carriers in different portions of the MCM spectrum.

In another embodiment of the invention, prioritized data are directed to, and modulated on, carriers in different portions of the MCM spectrum.

The instant invention also comprises an MCM modem designed for maximum performance in the transmission and reception of HDTV in a simulcast environment. An MCM modem is typically low in receiver complexity as compared to a wideband QAM modem and this should result in less expensive high definition television sets.

These and other objects, advantages, aspects and features of the instant invention will be more fully understood and appreciated upon consideration of the following detailed description of the preferred embodiments presented in conjunction with the accompanying drawings.

BRIEF DESCRIPTION OF THE DRAWINGS

FIG. 3($a$) and 3($b$) describe front end filtering in an NTSC receiver;

DETAILED DESCRIPTION OF PREFERRED EMBODIMENTS OF THE INVENTION

Figure 1:
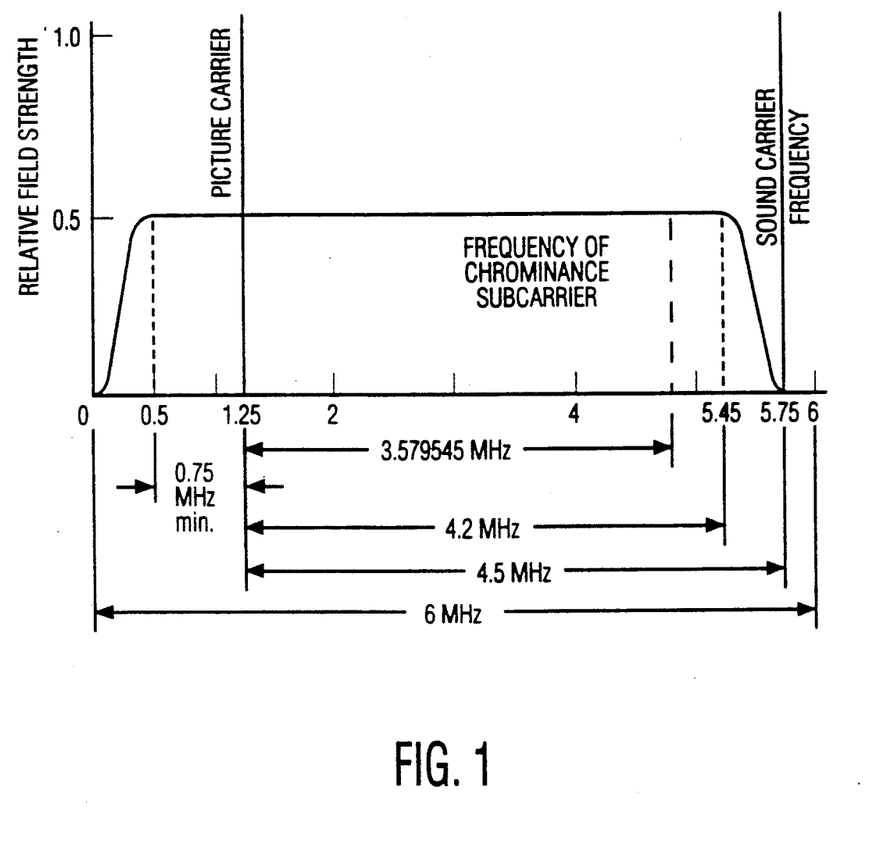
FIG. 1 is a graph indicating the amplitude vs. frequency characteristics of an ideal NTSC signal.
Figure 2:
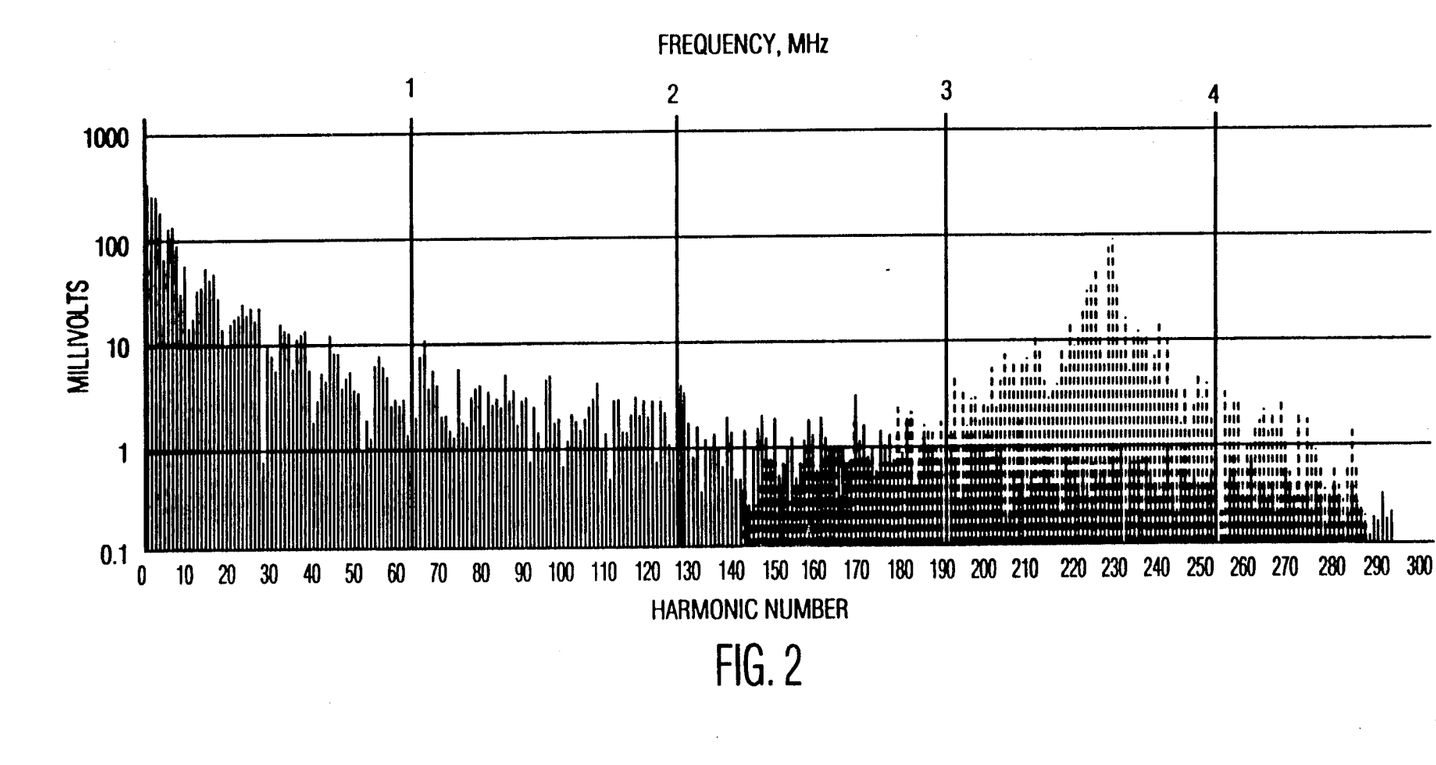
FIG. 2 is a graph indicating the baseband spectrum of an actual NTSC signal.

FIG. 1 illustrates an ideal NTSC signal characteristic showing the placement of the picture, chroma and sound carriers within the signal bandwidth. FIG. 2 describes the baseband spectrum of a color-bar NTSC signal, where an interval between two harmonic numbers represents a frequency interval equal to the product of the harmonic number and the horizontal scanning frequency (or the line-scanning rate), $f_h$, and the harmonic number 0 corresponds to the picture carrier. As can be seen from the FIG. 2, the spectrum of the color-bar NTSC signal is simply a line spectrum. This is true because a color-bar signal has no motion and has periodic components in both luminance and chrominance. It is known that the color-bar signal has a much larger average power than a typical NTSC signal.

In an actual NTSC signal which includes motion, each line frequency component gets "smeared" into clusters of components. For scenes in which the motion is sufficiently slow to perceive the detail of moving objects, it can be safely assumed that less than half the spectral space between the line-frequency harmonics is occupied by energy of significant magnitude. This unoccupied portion of the video signal spectrum may be filled by another signal, which will not be degraded by the presence of NTSC transmission. Thus, it is possible to send an MCM carrier of a much higher power in the interval between the two line-frequency components. Tests have shown that the observed interference of a carrier placed on top of a line-frequency component of an NTSC signal is the same as that of a carrier properly interleaved with the NTSC signal, i.e. placed between two line frequency components with a 14 dB higher power. A properly interleaved carrier not only is less interfering to the NTSC signal, it is also subject to less interference from the NTSC signal. This property is currently used in the "precision-offset" operation of co-channel NTSC stations.

Figure 3A:
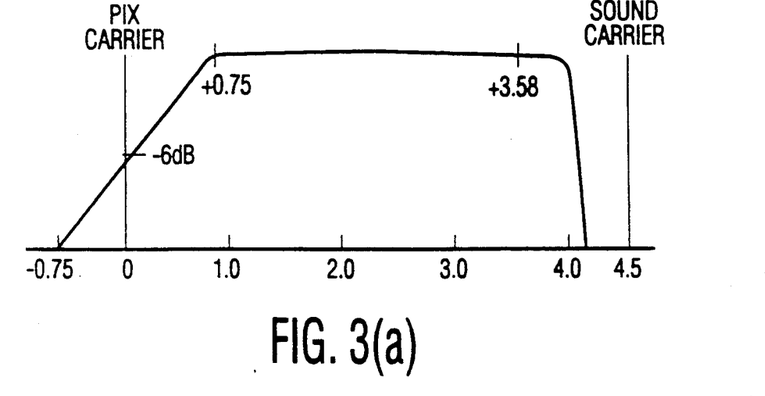
Figure 3B:
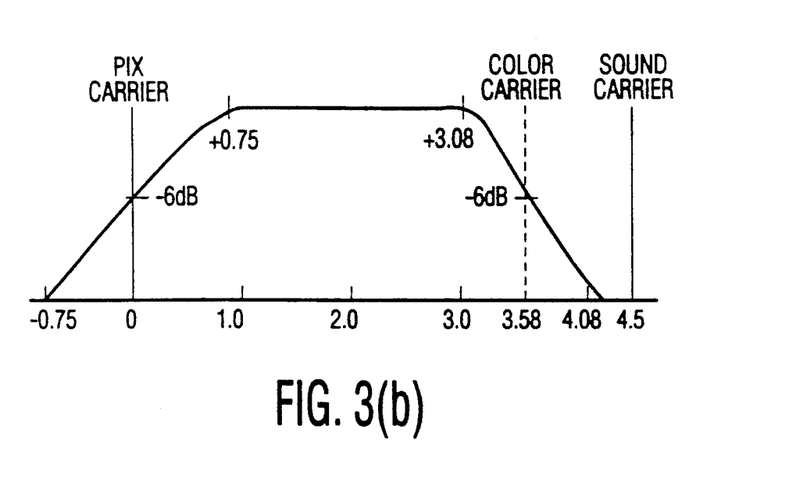

It has been generally accepted in the industry to implement the NTSC receiver front-end filtering as shown in FIGS. 3(a) and 3(b). In these figures, all frequencies are indicated with respect to the picture carrier. FIG. 3(a) shows the shape of the receiver IF amplitude response curve for a television receiver, which is well-known as Nyquist shaping. FIG. 3(b) shows the IF filter design simplification, which also provides an attenuation of the upper end of the channel, used mostly in modern receivers. These graphs make it clear that an interfering signal with a higher power can be tolerated by an NTSC receiver in the region below the picture carrier as opposed to the frequencies above the picture carrier. The inventive modulation systems described in the parent applications utilize this property to minimize interference between HDTV and NTSC co-channel signals. The instant invention also utilizes this property.

In a first embodiment of the the invention, incorporating the basic principles of MCM modulation, transmission and reception described in the incorporated references, a carrier level is assigned to each carrier by multiplying each carrier by a respective weighting coefficient. The weights for respective carriers are chosen to configure the MCM signal to provide minimum interference to, and from, an NTSC co-channel signal. An appropriate inverse weighting is provided at the receiver. Such interference is minimized by taking advantage of the multiple carriers conveying the information by eliminating those carriers which are frequency correlated to the luminance, chrominance and sound carriers of the NTSC signal.

Figure 4:
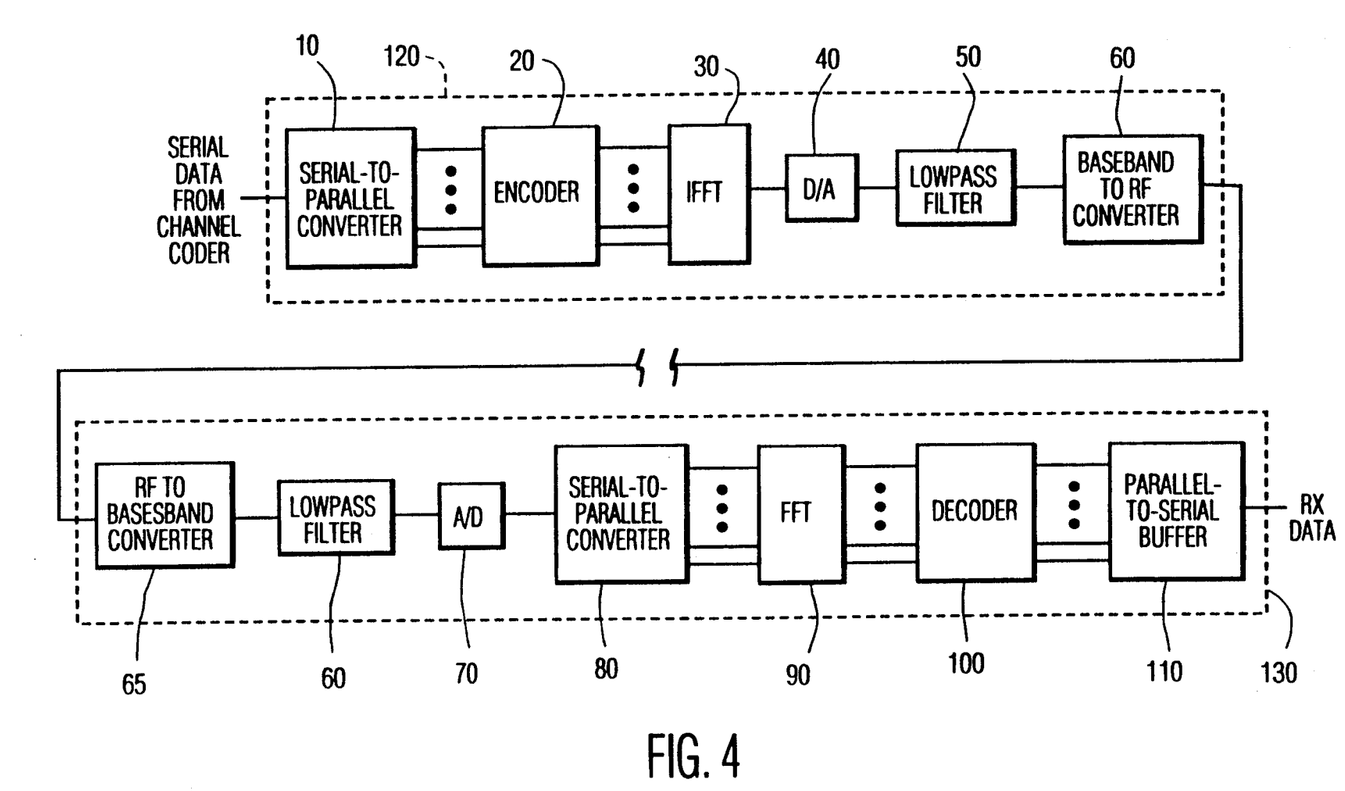
FIG. 4 is a block diagram of a modem suitable for implementing the invention.

FIG. 4 is a block diagram of an MCM modem adapted for use in accordance with the invention. In the modulator 120, a digital input bit stream (TX Data) is parallelized into n parallel data streams using the serial to parallel converter 10, where n equals the number of carriers used in the MCM signal. The parallel data streams are provided to the encoder 20. The functions of the encoder 20 comprise mapping each of the n parallelized bit streams into complex output symbols and weighting each of the symbols in accordance with respective coefficients derived from a signal reference, i.e. an NTSC signal spectrum. The weighted output symbols from the encoder 20 are passed through an inverse fast fourier transformer (IFFT) 30 where the weighted complex data streams are modulated on respective orthogonal frequency multiplexed carriers using the inverse fast fourier transform. The multiplexed multicarrier signal is then through a digital-to-analog (D/A) converter 40. This output is passed through a lowpass filter 50 to remove image frequencies, obtained by the D/A conversion. The output of the lowpass filter 50 then undergoes baseband to RF conversion in converter 66 and transmission to the demodulator 130.

At the demodulator 130, the received RF signal is converted to baseband in converter 65 and goes through an inverse processing via low pass filter 60, A/D converter 70, serial to parallel buffer 80, fast fourier transformer (FFT)90, decoder 100, and parallel to serial buffer 110. A more complete MCM receiver would include known additional circuitry such as a timing recovery circuit, equalization, etc., which are not shown in FIG. 4.

As explained above, a more robust yet minimally interfering MCM signal can be generated, for use in a "simulcast" environment, by choosing the frequency spacing of the carriers to be equal to half the NTSC line-scanning rate, $f_h$, which is equal to 7.862 KHz. This implies that the useful time interval on which the receiver 130 operates is equal to 127.194 $\mu$sec. An additional signal can be sent during a "guard" interval by the transmitter, which allows the channel response to die down before useful processing is started at the receiver. A 1024 point FFT can be used for example, which implies that their are 1024 carriers, so that the total bandwidth of operation is equal to 8,050,823.168 Hz. A significant number of these carriers will have to be zeroed out however by appropriate weighting in the modulator 120, to operate in a conventional television bandwidth, i.e. 6 MHz. In such a bandwidth, approximately 763 carriers can be sent. Some of these carriers will be zeroed out at frequency regions close to the band-edges and around the picture, chroma and the sound carriers of the NTSC co-channel signal. Also some carriers will be used for timing and carrier recovery as well as for equalization. Depending upon the exact implementation, about 650 to 700 carriers will be available for actual data transmission. If the guard time allowed is 22.8208 $\mu$sec, for example, then with 695 carriers, 4.5M symbols/sec can be transmitted.

The symbol time is given by the reciprocal of the carrier spacing, while the guard time can be obtained from the typical multipath expected in the terrestrial transmission of the MCM signal.

Figure 5:
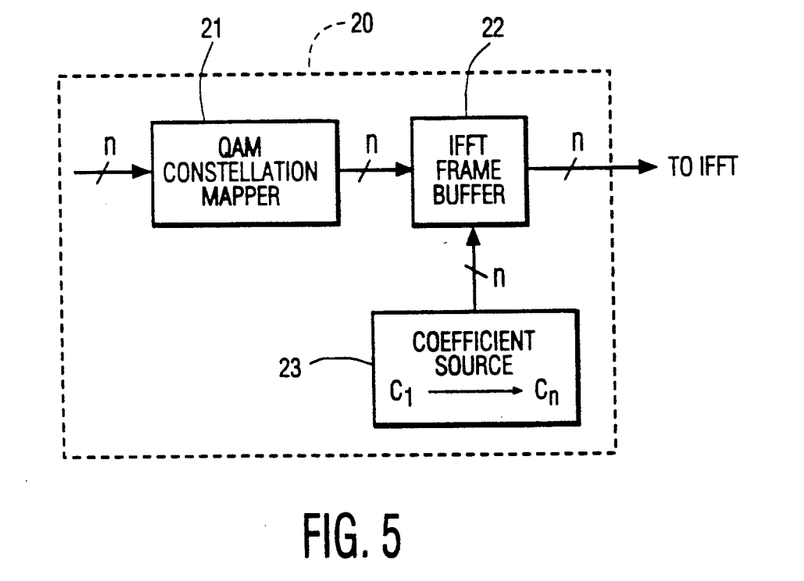
FIG. 5 is a block diagram of one embodiment of the encoder shown in FIG. 4.

FIG. 5 describes a first embodiment of the encoder 20. Each of then parallel data streams supplied by serial to parallel buffer 10 is encoded into a complex symbol, specified by an appropriate mapping on a QAM constellation, in constellation mapper 21. Such mapping techniques are known to those skilled in the art and are discussed and/or referred to in the references incorporated herein. Each resulting complex symbol stream is then multiplied by a respective weighting coefficient, $c_n$, n=1, 1024, in IFFT frame buffer 22, which comprises and a plurality of multipliers. The coefficients are derived in coefficient source 23 based upon an arbitrary NTSC spectrum reference which is stored, for example, in a ROM. These coefficients are weighted relative to each other and hence if one coefficient is arbitrarily given a weight of 1, the weights of the rest can be easily calculated using the NTSC spectrum reference.

In this first example, an NTSC spectrum derived from a spectral analysis of a color-bar video input is used to calculate the respective coefficients in coefficient source 23. Such a spectrum is shown in FIG. 2.

The coefficient source 23 comprises means for storing a representation of the spectrum and means for deriving coefficients from respective components of the spectrum. Coefficients are derived using means which incorporate known techniques of spectrum analysis discussed in the "Television Engineering Handbook" by Benson (pp. 5.34–5.36), which is incorporated by reference herein. Actual derivation of the coefficients, in accordance with the invention, is based upon the following rules:

For those MCM carriers placed higher in frequency with respect to the picture carrier of the NTSC spectrum, where the carriers are an even multiple of half the line-scanning rate, the coefficients are chosen to have an inverse relationship to the amplitudes of the respective line frequency components of the spectrum as shown, for example, in FIG. 2, i.e. the larger the amplitude of the frequency component, the smaller the weighting coefficient. For carriers placed at an odd multiple of the line-scanning rate, two cases arise. For the case where the chroma is interleaved with the luminance in the spectrum, the coefficients are evaluated such that the inverse relationship described above is maintained. For the case where no chroma signal component is present in the spectrum, a coefficient which is five times the coefficient next to it is used, where the "next" coefficient is arbitrarily defined to be the smaller coefficient among the two adjacent coefficients. This factor of five was mentioned above in connection with test results corresponding to equal visibility of interference for carriers placed at different points in the NTSC spectrum.

For carriers placed below the picture carrier, the Nyquist shaping (indicated in FIG. 3(a)) that is done at a typical NTSC receiver must be taken into account, and therefore two possibilities arise. For carriers to be placed in frequency at an even multiple of the line scanning rate, the coefficients are calculated having an inverse relationship with the line frequency components at that frequency, considering the Nyquist shaped NTSC spectrum. For frequencies placed at an odd multiple of the line-scanning rate, each coefficient is five times the coefficient next to it.

Using the above rules, the weighting coefficients can be provided which multiply each of the n complex symbol data streams in IFFT frame buffer 22 to minimize its respective MCM carrier in areas of higher activity within the NTSC reference signal, for example in the portions of the spectrum occupied by the picture, chroma and sound carriers, and maximize its respective carrier in areas least effecting conventional NTSC receivers. As described in the example below, the modulator 120 can thereby provide a shaped MCM signal having a much greater SNR with respect to an NTSC co-channel signal, as compared to conventional wideband digital modulation schemes.

While a color-bar spectrum was used as a reference for deriving the coefficients in the example above, other types of averaged NTSC spectrum references can also be used in accordance with the invention.

Figure 6:
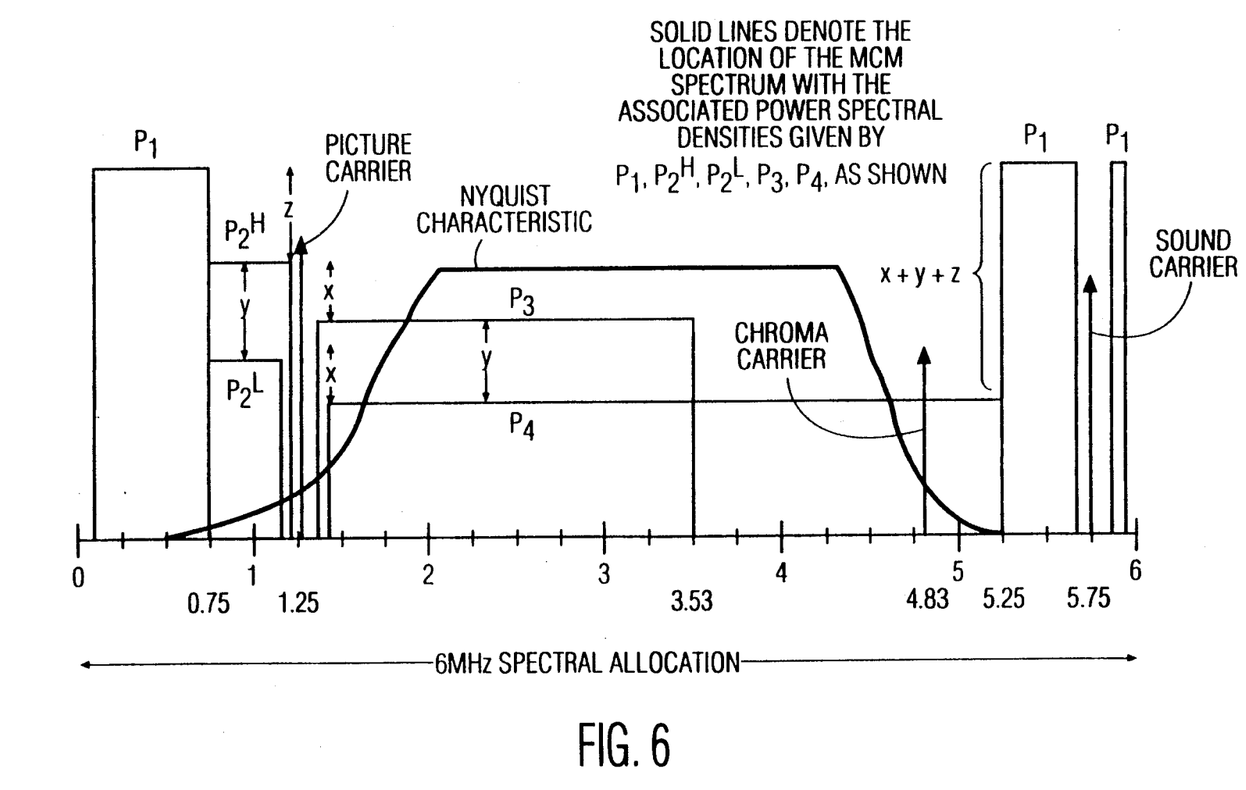
FIG. 6 is a graph indicating an embodiment of a carrier configuration in accordance with the invention.

A significant simplification in the weighting process is possible by selecting just five distinct coefficients, four of them corresponding to the four combinations of either the carriers placed above or below the picture carrier or the presence or absence of line frequency components at a given carrier location described above, and a fifth corresponding those portions of the received NTSC spectrum where almost no power is received after the Nyquist filtering in an NTSC receiver. FIG. 6 describes the MCM carriers according to their associated power spectral densities, $P_1$, $P^H_2$, $P^L_2$, $P_3$ and $P_4$, reflecting the five coefficients.

The relative amplitudes shown, reflect the "shaping" done by the five coefficients in the encoder 20 as described above. Using the NTSC reference spectrum as a guide, five distinct coefficients, rather than n coefficients, are selected in a desired relationship to one another and used to shape portions of the MCM spectrum with respect to the NTSC reference signal. In such a system, coefficient source 23 could be a simple memory based look-up table which assigns one of the five coefficients to each of the n parallel complex data streams provided by the mapper 21.

The exact frequency ranges used in this example, are shown in Table 1. The power level of P1 relative to the lowest power signal, $P_4$, is shown as $X+Y+Z$ dB. These power levels must be evaluated by interference experiments. In the examples described below, some nominal values for X,Y and E are assumed, to obtain "conservative" and "aggressive" designs described below.

The carriers appearing in the portions of the 6 MHz spectrum denoted as $P_1$ have the highest power level, reflecting for example the use of the highest of the five coefficients. These portions are placed in areas of the spectrum where little or no signal is seen by the NTSC receiver. A guard band of 0.075 MHz is left at the two ends of the 6 MHz spectrum and is assumed to be sufficient due to the severe drop in the power level at the band edges in an MCM transmission scenario.

$P^H_2$ and $P^L_2$ are alternating carriers sent in the frequency regions as shown in Table 1, such that the carriers corresponding to $P^H_2$ lie exactly between two line-frequency components associated with the co-channel NTSC signal, while the carriers corresponding to $P^L_2$ lie on top of the line-frequency components. As described above, the carriers associated with $P^H_2$ can therefore be transmitted at a higher power with the same perceived level of interference as the carriers associated with $P^L_2$. This power difference is denoted as Y. Similarly, $P_3$ and $P_4$ also correspond to higher and lower powered alternating carriers.

Using the NTSC reference spectrum as a guideline, no carriers of higher power are transmitted beyond a harmonic number of 145, otherwise, a substantial amount of interference will be seen in the chroma section of the co-channel NTSC signal. However, carriers of the same power as that of $P_4$ are sent on these carriers. The difference in power levels $P_3$ and $P_4$ as compared with $P^H_2$ and $P^L_2$, respectively, indicated as X, is to take into account NTSC receiver Nyquist filter characteristics discussed above, which allow a more powerful interfering signal to be tolerated in the region below the picture carrier. The Nyquist filter characteristic is also shown on the graph of FIG. 6.

Experimental data indicates that X can be any value up to about 12 dB. For the "conservative" example summarized below, a nominal value of about 5 dB can be chosen. In a more "aggressive" design, a value of about 7.5 dB could be used for X. From interference tests done using only a single carrier, Y can be at most about 14 dB. However, since MCM carriers are are typically a band of frequencies, the interference effects into NTSC are not known. A nominal value of about 5 dB for Y could be used for a "conservative" design and a value of about 7.5 dB for an "aggressive" design. The value of Z is limited by the adjacent channel interference that can be caused to an adjacent NTSC channel or by the amount of interference into the sound carrier of the NTSC co-channel signal. A value of 2.5 dB for Z is used herein.

In the example represented by the values of Table 1, 695 carriers are used to transmit data in the MCM signal. The bandwidth fraction is defined as the total nominal bandwidth used by these carriers as a fraction of the total available 6 MHz bandwidth. The sum of these fractions equals 0.91 and represents the utilization of the total available 6 MHz bandwidth which is 5.46 MHz. Apart from the guard band at either end of the spectrum, some bandwidth is also lost near the picture and the sound carrier. In order to provide for the FM baseband requirements of the sound carrier, a 0.2 MHz portion is also lost in the region surrounding the sound carrier.

The following indicates the criteria used to suppress the MCM carriers occurring in the frequencies around the NTSC picture carrier. Again, this suppression is accomplished by the coefficient weighting in the encoder 20 described above.

For the MCM carriers exactly on top of the line-frequency components associated with the NTSC reference signal, the MCM carriers are not suppressed only if the amplitudes of the corresponding NTSC spectrum are at least 20 dB less in power as compared to the picture carrier. This is done to protect the MCM carriers from the NTSC interference into MCM.

For the MCM carriers between the NTSC line-frequency components, the space immediately adjacent to the picture carrier is avoided so that any interference from the NTSC signal into the MCM signal is minimal. This space could be used to transmit an unmodulated carrier for frequency synchronization.

If the nominal bandwidth used in the MCM design is assumed to be 5.46 MHz, we can calculate the raw bit rates that can be transmitted for this bandwidth, for different modulation formats, if all the carriers are assumed to be modulated by the same QAM modulation format. These rates are shown in the Table 2.

A further improvement in performance can be achieved by assigning different modulation formats to each of the MCM carriers. Thus the extra power available in a given MCM design can be exploited by sending more data, thus trading power for higher bit-rate transmission.

In the modem embodiment described above, serial to parallel converter 10 and encoder 20 provided a stream of complex symbols to IFFT 30 which were all mapped in the same format, for example 16 QAM which would achieve a data transmission rate of 18 Mbps. This transmission rate would be increased to 22.5 Mbps if 32 QAM were used however. The effect of different modulation formats for different MCM carriers will be analyzed below.

Table 3 we list the bit-rate possible by using differing modulation formats over each of the different set of MCM carriers with the power levels, $P_1$, $P^H_2$, $P^L_2$, $P_3$ and $P_4$. Different strategies can be used to get variable bit rates by using different mapping constellations for different MCM carriers.

In the following examples, the number of points in a constellation, as noted by the numeral prefix, is the key design parameter. It is to be understood that although the constellations are denoted as QAM in these examples, other PAM-PSK constellations could be used with similar results. To obtain the proper reliability, the difference in power levels that can be sent over these carriers must be taken into

TABLE 1

| Properties | Characterization of the MCM Carriers Shown in FIG. 4 | | | | |
|---|---|---|---|---|---|
| | $P_1$ | $P_2^H$ | $P_2^L$ | $P_3$ | $P_4$ |
| Frequency Range in MHz | 0.075 to 0.7, 5.25 to 5.62, 5.85 to 5.925 | 0.75 to $1.25 - f_h$ | 0.75 to $1.25 - 4f_h$ | $1.25 + f_h$ to $1.25 + 144 f_h$ | $1.25 + f_h$ to 5.25 MHz |
| Total Carriers | 146 | 30 | 27 | 144 | 348 |
| Bandwidth Fraction | 0.1913 | 0.0393 | 0.0354 | 0.1887 | 0.456 |
| Power Level | X + Y + Z dB | X + Y dB | X dB | Y dB | 0 dB |

TABLE 2

| Uncoded Bit-Rates Transmitted Using MCM. | | | |
|---|---|---|---|
| QAM Scheme | ADTV Rates | Rate (b/s/Hz) | 5.46 MHz Bw |
| 16 QAM | 19.2 Mbps | 3.282 | 17.93 Mbps |
| 32 QAM | 24 Mbps | 4.1 | 22.4 Mbps |
| 64 QAM | | 4.923 | 26.9 Mbps |

TABLE 3

| | Uncoded Bit Rates Possible in Mbps Using Different QAM Alphabets Over Different MCM Carriers. | | | | | |
|---|---|---|---|---|---|---|
| QAM | Rate in Bits/s/Hz | $P_1$ (146) | $P_2^H$ (30) | $P_2^L$ (27) | $P_3$ (144) | $P_4$ (348) |
| 4 | 1.641 | 1.88 | 0.39 | 0.35 | 1.86 | 4.49 |
| 8 | 2.461 | 2.82 | 0.58 | 0.52 | 2.79 | 6.73 |
| 16 | 3.282 | 3.77 | 0.77 | 0.7 | 3.72 | 8.98 |
| 32 | 4.1 | 4.71 | 0.97 | 0.87 | 4.64 | 11.22 |
| 64 | 4.923 | 5.65 | 1.16 | 1.04 | 5.57 | 13.47 |
| 128 | 5.743 | 6.59 | 1.35 | 1.22 | 6.5 | 15.71 | account. With reference to FIG. 6, the values of X, Y and Z will decide the extra power that can be sent using MCM.

The following are examples of conservative and aggressive designs:

"Conservative" Design

For a conservative implementation, the following configuration could be used:
Use 16 QAM on $P_4$.
Use 64 QAM on $P^H_2$, $P^L_2$ and $P_3$.
Use 128 QAM on $P_1$.

With the above parameters, using the channel coding strategy with a (216,192) RS code and a 0.9 rate trellis code, for example, the total available payload is 19 Mbps. Currently proposed digital HDTV signals anticipate a payload of 18.5 Mbps. Using this design the invention would therefore yield an additional data rate of 0.5 Mbps, which could be used to transmit a secondary audio program.

"Aggressive" Design

In this design, the power assumptions made above are maintained. With this design, the power corresponding to all carriers other than $P_4$ is improved. Since, the coverage area is decided by the weakest link in the chain, the bits sent on the MCM carriers with a power level given by $P_4$ must be protected. Thus, the following design could be used.

Use 8 QAM on $P_4$.
Use 64 QAM on $P^L_2$ and $P_3$.
Use 128 QAM on $P_1$ and $P^H_2$.

The total available payload is 17.34 Mbps. From comments made in the previous section, it is clear that the bit streams sent using the MCM carriers with power levels $P^L_2$, $P_3$ and $P_4$ have the same reliability. In this case, the bit streams sent using the MCM carriers with power levels $P_1$ have a higher reliability than the bit streams related to $P^H_2$. A higher payload can be obtained by using 256 QAM for MCM carriers using $P_1$, but the higher constellation size may cause significant degradations in actual modem implementation. It is assumed in this example that $Z=0$ dB, i.e., $P_1$ and $P^H_2$ have the same power level and hence the same reliability.

A further design for the transmission of conventional quality digital television (as opposed to HDTV), which is also referred to in the industry as digital NTSC, will need only a small subset of all the carriers available. It is assumed herein that an approximate payload of 7.5 Mbps is required for transmission of the entire digital NTSC signal. The following strategy can therefore be used.

Use 2 QAM on $P_4$.
Use 8 QAM on $P^L_2$ and $P_3$.
Use 32 QAM on $P_1$ and $P^H_2$.

Figure 7:
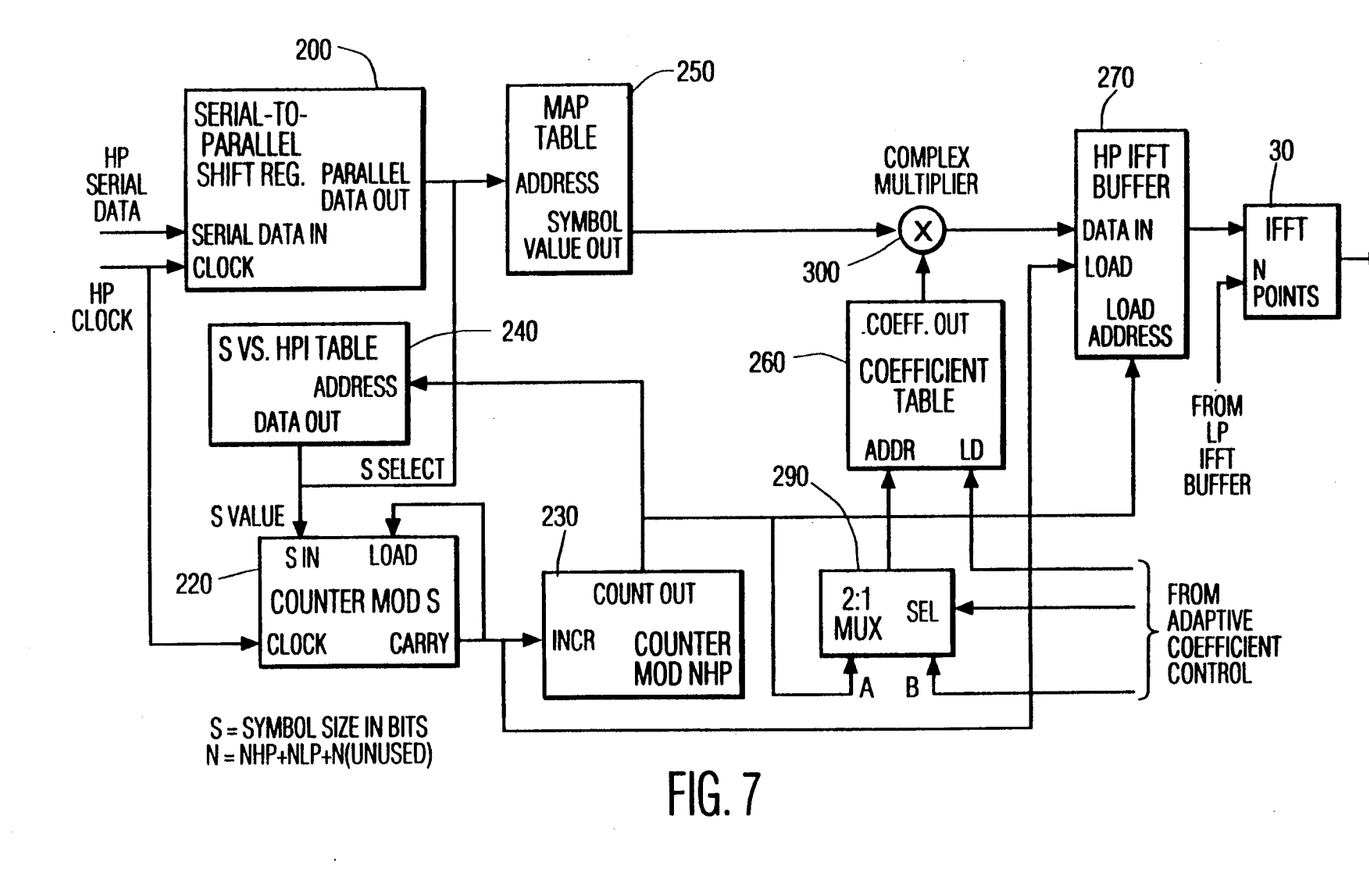
FIG. 7 is a block diagram of an embodiment of a circuit which incorporates the functions of the serial to parallel converter and encoder shown in FIG. 4.

FIG. 7 describes a preferred embodiment of a circuit which incorporates and performs, in a prioritized manner, the functions of serial to parallel converter 10 and encoder 20. This circuit can be used in the modulator 120, to implement modulation format strategies such as those described in the designs described above.

As described in the '383 and '006 applications, the the serial data provided by the channel coder can consist of higher and lower priority data. The respective priorities can be identified as part of the respective data words and therefore easily separated after channel coding. Therefore, since it is well within the skill of those knowledgeable in the art to separate the serial data into a higher priority (HP) serial stream and a lower priority (LP) serial stream, the following explanation will assume that this has been done in the channel coder and that the HP and LP streams are being provided to the serial to parallel converter shown in FIG. 7. The circuit of FIG. 7 has the additional advantage therefore, of directing input data having different priorities, to different groups of carriers.

FIG. 7 actually shows only one section of the circuit (for HP data) and it is to be understood that an identical circuit, optimized for LP data, is also part of FIG. 7. Indeed, if more than two priorities exist in the input serial data, a separate section as described, could be used for each of them. In the following discussion of FIG. 7, only the operation of the circuit with regard to HP data will be explained in detail. LP data is handled in the same manner in a duplicate circuit (not shown) which forms part of FIG. 7.

HP serial data and associated clock information is provided to an input of serial to parallel shift register 200 which provides a symbol having a number of bits, S, for each serial HP data word. The number of bits, S, given to each symbol is directly related to the modulation format (i.e. the bit length QAM implemented in map table 250) used to generate each of the n complex symbols. Shift register 200 is controlled by modulo S counter 220 which counts the HP clock pulses, i.e. HP input bits.

A look-up address table 240 controls counter 220 by providing for each of the n inputs to IFFT 30 (corresponding to the n carriers as described above), a value for S. As described in the "conservative" design above, for example, those complex symbols to be modulated on carriers corresponding to $P_4$ would be mapped using 16 QAM. Those corresponding to $P^H_2$, $P^L_2$ and $P_3$ would be mapped using 64 QAM, and those corresponding to $P_1$ would be mapped using 128 QAM. The circuit of FIG. 7 can accomplish this selective mapping.

It will be assumed that for a particular design, selected N inputs to the IFFT 30, and therefore corresponding selected N carriers, will be supplied with complex symbols derived for the HP data. These N inputs/carriers could be contiguous or spectrally separated (i.e. in different P groups). The modulo N counter 230 sequentially provides an input address K, representing a count from O to N, to address table 240. Stored in address table 240 are values of S for each value of K. This address table is preprogrammed in ROM (for example) to follow a particular design. Since each value of S is related to a chosen modulation format (mapping), such a table for the "conservative" design would reflect bit lengths S for each address K (i.e. for each of the carriers in the respective P groups). The value of S selected for the Kth count is loaded into counter 220 which counts S clock pulses and then generates a carry. At this point shift register 200 contains S bits of HP data. The output of the shift register 200, combined with the value of S provided by table 240 at the selected address K, is used to address map table 250. Map table 250 is a look-up table in which actual complex symbol values are stored and which performs the mapping of the parallel output of shift register 200 into a complex symbol corresponding to an SQAM format.

Coefficient table 260 is a look-up table which corresponds to the coefficient source 23 described in FIG. 5. Multiplexer 290 acts as a switch to permit addressing of the coefficient table to be a function of input A, the address signal K from counter 230. In this example, we will assume that the address signal for coefficient table 260 is the address signal K from counter 230 (input A). An adaptive approach utilizing input B, will be discussed below.

Assuming that the coefficient table 260 has been set up to correlate a number of coefficient weights to be assigned to each of the N map table complex symbol outputs, the address signal K will select the appropriate coefficient which will be multiplied with the corresponding complex symbol in multiplier 300. Each weighted complex symbol is loaded into IFFT buffer 270 at an address which is also determined by address signal K. The loading of the weighted complex symbol is controlled by the carry signal which occurs after each group of S bits has been input (i.e. counter 220=S). The carry signal also increments counter 230 which generates the next address K.

When all of the IFFT buffer 270 locations have been filled with the N weighted complex symbols, and a corresponding IFFT buffer in the LP section (not shown) have also been filled, the contents of both buffers are sent to IFFT 30.

Although not described in detail, it is to be understood that the invention comprises a demodulator which incorporates means for decoding MCM signals modulated using the circuits of FIGS. 5 and 7. Such a decoding means would comprise complementary coefficient inverse weighting look-up tables and, if necessary (i.e. to decode signals from a FIG. 7 type circuit) correlated map and S select tables.

Figure 8:
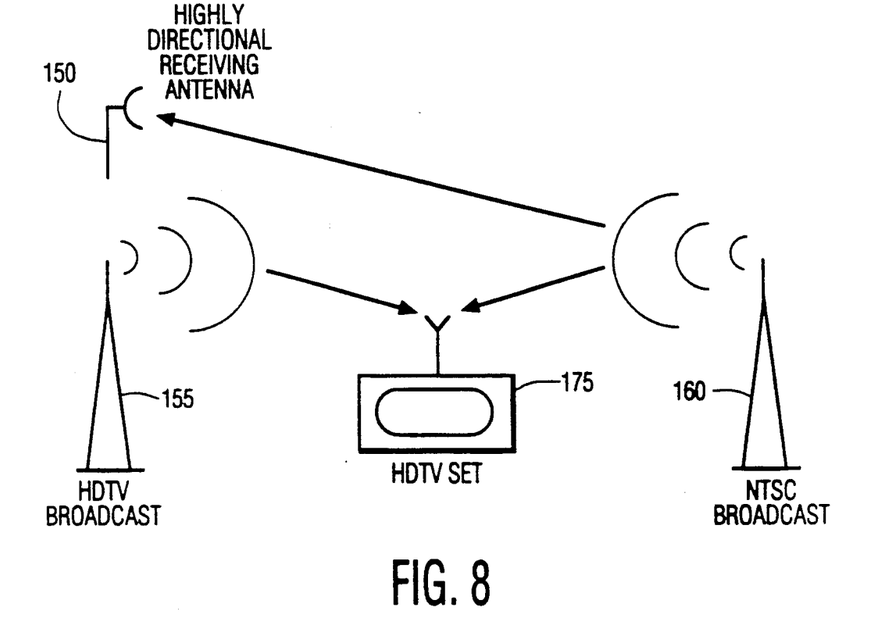
FIGS. 8 and 9 are block diagrams illustrating an adaptive MCM system comprising the invention.
Figure 9:
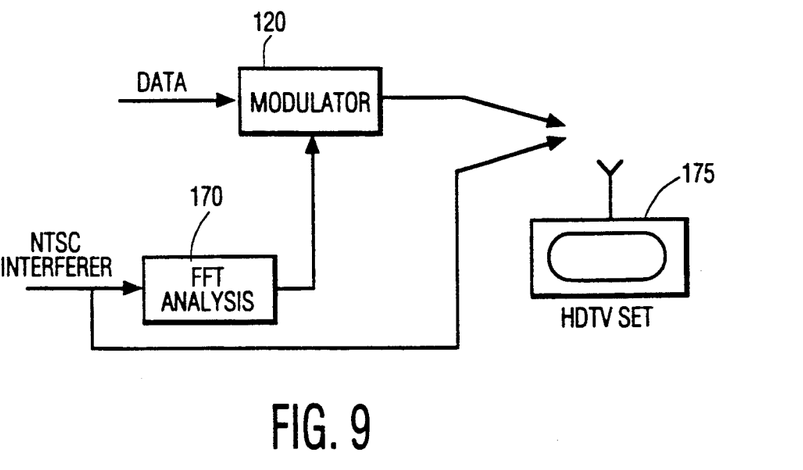

FIGS. 8 and 9 illustrate another embodiment of the invention which functions in an adaptive way by using, for example, the actual NTSC co-channel signal as the NTSC spectrum reference, instead of the color bar spectrum discussed above, in conjunction with, for example, the MCM modulator 120. As shown in FIG. 8, a highly directional receiving antenna 150 is used by the HDTV "simulcast" transmitter site 155, to receive the instantaneous NTSC co-channel signal broadcast 160.

As shown in FIG. 9, the modulator 120 at the transmitter site 155 subjects the received spectrum of the NTSC co-channel to FFT analysis 170, and the results of this spectral analysis is then used as the NTSC reference for deriving the weighting coefficients as described above. These coefficients are then fed to the encoder of MCM modulator 120. The coefficients can thus be updated periodically to adapt to changes in the interference characteristics presented by the NTSC co-channel signal. The update rate depends upon the trade-off that exists between the coefficient information transmitted and the improvement in performance.

The adaptive embodiment described above can also be used with the circuit of FIG. 7. Multiplexer 290 permits the use of an adaptive mode (input B) as an alternative to the non-adaptive mode described above.

In the non-adaptive mode, the coefficient table 260 contains a set of pre-programmed coefficients correlated to the complex symbols associated with each MCM carrier. These coefficients, as stated above, are determined based upon a spectral analysis of an NTSC reference signal (i.e. a color bar spectrum). In the non-adaptive mode, the coefficient table is addressed by signal K from counter 230 to apply shaping to each of the N complex symbols from map table 250 in sequence. In the adaptive mode, the coefficient table 260 must be programmable (i.e. RAM). Input B, when selected by the SEL signal, periodically loads the coefficients calculated by FFT analysis 170 into coefficient table 260. The multiplexer 290 is then switch back to input A and addressing occurs in the same manner as in the adaptive mode. A similar programmable coefficient table would be present in a demodulator present in an HDTV receiver 175, in accordance with the invention, and would similarly be able to configure itself using an identical FFT analysis performed on the received NTSC co-channel signal.

The FCC has stated that eventually it expects to phase out NTSC broadcasting in favor of the "simulcast" HDTV broadcasts, as more NTSC receivers are replaced by HDTV receivers in the home. Currently proposed "simulcast" systems provide varying methods by which interference to the NTSC co-channel signals is avoided. All of these methods reduce in some manner the robustness of the "simulcast" signal. Using the instant invention however, once an NTSC co-channel signal is removed from service, the coefficients can easily be changed so that the "simulcast" signal can be free of unnecessary modification, without requiring the purchase of a new HDTV receiver or new broadcasting equipment. In fact, using the invention, should the newly available co-channel be assigned to another HDTV signal, or other type of communication service signal, coefficients could easily be derived to provide, based on this new signal, similar anti-interference advantages.

While certain representative embodiments and details have been shown for the purpose of illustrating the present invention, it will be apparent to persons skilled in the art that various modifications may be made in the disclosed systems without departing from the spirit and the scope of the disclosed invention.

We claim:

1. A system for encoding a television signal comprising:
   a) means for coding a first television signal into a plurality of digital symbols;
   b) means coupled to said coding means, for mapping each of said digital symbols into respective complex symbols;
   c) means coupled to said mapping means, for deriving a plurality of coefficients based upon a signal reference;
   d) means coupled to said deriving means, for multiplying each of said complex symbols with a respective coefficient so as to form a plurality of weighted complex symbols; and
   e) means coupled to said multiplying means, for modulating each of said weighted complex symbols on a respective carrier.

2. The system as claimed in claim 1, wherein said modulating means utilizes OFDM.

3. The system as claimed in claim 2, wherein said mapping means comprises at least one PAM-PSK constellation.

4. The system as claimed in claim 3, wherein said mapping means comprises means for mapping selected digital symbols using different PAM-PSK constellations.

5. A television receiver comprising:
   a) means for receiving the television signal coded by the system claimed in claim 4; and
   b) a demodulator for providing from said television signal, said digital symbols.

6. A television receiver comprising:
   a) means for receiving the television signal coded by the system claimed in claim 3; and
   b) a demodulator for providing from said television signal, said digital symbols.

7. The system as claimed in claim 2, wherein said mapping means comprises at least one QAM constellation.

8. A television receiver comprising:
   a) means for receiving the television signal coded by the system claimed in claim 7; and
   b) a demodulator for providing from said television signal, said digital symbols.

9. A television receiver comprising:
   a) means for receiving the television signal coded by the system claimed in claim 2; and b) a demodulator for providing from said television signal, said digital symbols.

10. The system as claimed in claim 1, wherein said signal reference is a preprogrammed spectrally analyzed conventional television signal.

11. A television receiver comprising:
a) means for receiving the television signal coded by the system claimed in claim 10; and
b) a demodulator for providing from said television signal, said digital symbols.

12. The system as claimed in claim 1, wherein said signal reference is an external interference signal, and wherein said system further comprises:
a) means coupled to said deriving means, for receiving said interference signal; and
b) means for spectrally analyzing said interference signal so as to form said coefficients.

13. A television receiver comprising:
a) means for receiving the television signal coded by the system claimed in claim 12; and
b) a demodulator for providing from said television signal, said digital symbols.

14. A television receiver comprising:
a) means for receiving the television signal coded by the system claimed in claim 1; and
b) a demodulator for providing from said television signal, said digital symbols.

15. A method for encoding a television signal comprising the steps of:
a) coding a first television into a plurality of digital symbols;
b) mapping each of said digital symbols into respective complex symbols;
c) deriving a plurality of coefficients based upon a signal reference;
d) multiplying each of said complex symbols with a respective coefficient so as to form a plurality of weighted complex symbols; and
e) modulating each of said weighted complex symbols on a respective carrier.

* * * * *